(12) United States Patent
Yano et al.

(10) Patent No.: US 6,235,428 B1
(45) Date of Patent: May 22, 2001

(54) ENCLOSED ALKALI STORAGE BATTERY

(75) Inventors: Mutsumi Yano; Syuichi Suzuki, both of Hirakata; Mitsunori Tokuda, Osaka; Mitsuzou Nogami, Itano-gun; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/331,969

(22) PCT Filed: Jan. 12, 1998

(86) PCT No.: PCT/JP98/00098
§ 371 Date: Jun. 30, 1999
§ 102(e) Date: Jun. 30, 1999

(87) PCT Pub. No.: WO98/34290
PCT Pub. Date: Aug. 6, 1998

(30) Foreign Application Priority Data

Jan. 30, 1997 (JP) ................................. H9-033126
Aug. 27, 1997 (JP) ................................. H9-247778
Sep. 24, 1997 (JP) ................................. H9-278118

(51) Int. Cl.$^7$ ...................................... H01M 4/32

(52) U.S. Cl. .......................... 429/223; 429/224; 429/229; 429/231; 429/163

(58) Field of Search ................................. 429/218.2, 222, 429/223, 224, 229, 231, 163

(56) References Cited

U.S. PATENT DOCUMENTS

| | | | |
|---|---|---|---|
| 5,861,225 | * | 1/1999 | Corrigan et al. ..................... 429/223 |
| 6,013,390 | * | 1/2000 | Kimiya et al. ....................... 429/206 |

FOREIGN PATENT DOCUMENTS

| | | |
|---|---|---|
| S45-3570 | 2/1970 | (JP) . |
| S49-114741 | 1/1974 | (JP) . |
| 53-032347 | 3/1978 | (JP) . |
| 55-030133 | 3/1980 | (JP) . |
| 59-016271 | 1/1984 | (JP) . |
| 2-262244 | 10/1990 | (JP) . |
| 5-182662 | 7/1993 | (JP) . |
| 5-290841 | 11/1993 | (JP) . |
| 7-022027 | 1/1995 | (JP) . |
| 8-045508 | 2/1996 | (JP) . |
| 8-115722 | 5/1996 | (JP) . |
| 8-162111 | 6/1996 | (JP) . |
| 9-161797 | 6/1997 | (JP) . |
| 9-180717 | 7/1997 | (JP) . |
| 9-199119 | 7/1997 | (JP) . |

OTHER PUBLICATIONS

*Batteries*, "Manganese Dioxide," vol. 1, ed. By Karl V. Kordesch, Marcel Dekker, Inc., New York (1974), pp. 263–266.

* cited by examiner

*Primary Examiner*—Laura Weiner
(74) *Attorney, Agent, or Firm*—Kubovcik & Kubovcik (57) ABSTRACT

A sealed alkaline storage battery using, as a positive electrode active material, nickel oxyhydroxide including Mn as a solid-solution element and having a γ ratio of 65 through 100%; a sealed alkaline storage battery using, as a positive electrode active material, nickel oxyhydroxide including as an additive or coated with a rare earth element and/or a rare earth compound in a ratio measured based on the rare earth element of 0.05 through 5 wt %; and a sealed alkaline storage battery including, as a positive electrode active material, nickel oxyhydroxide having a half-width of a peak in a lattice plane (003) in an X-ray diffraction pattern of 0.8° or more. The pressure within the battery is not largely increased for a long period of charge-discharge cycles, and hence, the electrolyte hardly leaks.

4 Claims, 3 Drawing Sheets

ENCLOSED ALKALI STORAGE BATTERY

TECHNICAL FIELD

The present invention relates to a sealed alkaline storage battery including a positive electrode active material and a negative electrode active material packed in total in a battery can at 75% by volume or more of the content volume of the battery can. More particularly, it relates to improvement of a positive electrode active material for the purpose of providing a highly reliable sealed alkaline storage battery from which an electrolyte hardly leaks for a long period of charge-discharge cycles.

BACKGROUND ART

Manganese dioxide has been proposed as a positive electrode active material for a sealed alkaline storage battery using zinc as a negative electrode active material (Japanese Patent Publication No. 45-3570). Also, a mixture of nickel oxide and manganese dioxide has been proposed as a positive electrode active material for an alkaline primary battery using zinc as a negative electrode active material (Japanese Laid-Open Patent Publication No. 49-114741).

However, manganese dioxide is poor in reversibility in a charge-discharge reaction and is difficult to return to manganese dioxide by charge after discharge. Therefore, the utilization of the active material is rapidly lowered through repeated charge-discharge cycles, resulting in rapidly decreasing the discharge capacity. Furthermore, the oxygen evolution potential of manganese dioxide is so low that the pressure within the battery is increased due to an oxygen gas generated through decomposition of water on the positive electrode during charge. As a result, the adhesion in a connecting portion of a battery housing member is degraded, so that the electrolyte can easily leak.

On the other hand, when the mixture of nickel oxide and manganese dioxide is used in a storage battery (secondary battery) that is repeatedly charged and discharged, the oxygen evolution potential of the mixture is so low that the pressure within the battery can be easily increased during charge and the electrolyte can easily leak similarly to the battery using manganese dioxide. Furthermore, manganese dioxide included in the mixture is poor in reversibility in a charge-discharge reaction, and hence, the utilization of the active material is rapidly lowered through repeated charge-discharge cycles, resulting in rapidly decreasing the discharge capacity.

In this manner, both of the positive electrode active materials are too disadvantageous to be used as a positive electrode active material for a sealed alkaline storage battery. The increase of the pressure within a battery during charge and the resultant leakage of the electrolyte are particularly significant in a sealed alkaline storage battery including an active material in a large amount.

Accordingly, an object of the invention is providing a highly reliable sealed alkaline storage battery including an active material in a large amount but hardly suffering electrolyte leakage for a long period of charge-discharge cycles.

Another object of the invention is providing a sealed alkaline storage battery that can keep high utilization of an active material not only in initial stages of charge-discharge cycles but also for a long period of time.

DISCLOSURE OF INVENTION

The sealed alkaline storage battery (hereinafter referred to as the "first battery") according to claim 1 (first invention) comprises a negative electrode of a zinc electrode, a cadmium electrode or a hydrogenated hydrogen-absorbing alloy electrode; and a positive electrode active material and a negative electrode active material packed in total in a battery can at 75% by volume or more of a content volume of the battery can, and the positive electrode active material includes 60 through 100 wt % of nickel oxyhydroxide including Mn as a solid-solution element and having a γ ratio defined as follows of 65 through 100%, and 40 through 0 wt % of α-Ni(OH)$_2$:

$$\gamma \text{ ratio } (\%) = \{S1/(S1+S2)\} \times 100$$

in which S1 indicates a peak area in a lattice plane (003) in an X-ray diffraction pattern of the nickel oxyhydroxide including Mn as a solid-solution element; and S2 indicates a peak area in a lattice plane (001) in the X-ray diffraction pattern of the nickel oxyhydroxide including Mn as a solid-solution element.

The peak area S1 in the lattice plane (003) in the above-described formula corresponds to the amount of γ-nickel oxyhydroxide included in the nickel oxyhydroxide, and the peak area S2 in the lattice plane (001) in the formula corresponds to the amount of β-nickel oxyhydroxide included in the nickel oxyhydroxide. Accordingly, the γ ratio corresponds to the proportion (%) of γ-nickel oxyhydroxide in the nickel oxyhydroxide.

The first battery uses the positive electrode active material including 65 through 100 wt % of nickel oxyhydroxide including Mn as a solid-solution element and having a γ ratio of 65 through 100%, and 40 through 0 wt % of α-Ni(OH)$_2$. When the proportion of the nickel oxyhydroxide including Mn as a solid-solution element is smaller than 60 wt %, namely, when the proportion of α-Ni(OH)$_2$ exceeds 40 wt %, the oxygen overvoltage of the positive electrode becomes too low to obtain a sealed alkaline storage battery hardly suffering electrolyte leakage for a long period of charge-discharge cycles. Also, when the γ ratio is smaller than 65% and a large amount of β-nickel oxyhydroxide is included, the oxygen overvoltage of the positive electrode is so low that an oxygen gas can be easily generated. The γ ratio is preferably 90 through 100%.

The nickel oxyhydroxide including Mn as a solid-solution element can be obtained by oxidizing nickel hydroxide including Mn as a solid-solution element with an oxidizing agent. Examples of the oxidizing agent are sodium hypochlorite, potassium permanganate and potassium persulfate. A desired γ ratio can be attained by increasing/decreasing the amount of the oxidizing agent to be added. When a larger amount of the oxidizing agent is added, a higher γ ratio is attained.

The nickel oxyhydroxide including Mn as a solid-solution element preferably has a Mn ratio defined as follows of 5 through 50%:

$$\text{Mn ratio } (\%) = \{M/(M+N)\} \times 100$$

wherein M indicates the number of Mn atoms included in the nickel oxyhydroxide including Mn as a solid-solution element; and N indicates the number of Ni atoms included in the nickel oxyhydroxide including Mn as a solid-solution element.

When the Mn ratio is lower than 5%, the oxygen overvoltage (oxygen evolution potential—charge potential) cannot be sufficiently increased by adding Mn as a solid-solution element to nickel oxyhydroxide, and hence, an oxygen gas can be easily generated on the positive electrode. On the other hand, when the Mn ratio is higher than 50%, Mn cannot be completely dissolved as a solid-solution element in nickel oxyhydroxide, and hence, a generated free Mn oxide obstructs the discharge.

The Mn ratio is equal to the proportion (%) of the number of Mn atoms included in the nickel hydroxide including Mn as a solid-solution element to the total number of Mn atoms and Ni atoms. Accordingly, nickel oxyhydroxide having a desired Mn ratio can be obtained by adjusting the amounts of a Mn material (such as manganese sulfate) and a Ni material (such as nickel sulfate) to be mixed for preparing nickel hydroxide including Mn as a solid-solution element.

The first invention is applied to a sealed alkaline storage battery including the active materials packed in total in the battery can at 75% by volume or more of the content volume of the battery can for the following reason: Particularly in a sealed alkaline storage battery including a large amount of active materials packed in a battery can, the pressure within the battery is easily increased, and the electrolyte can easily leak during repeated charge-discharge cycles. The increase of the pressure within the battery can be remarkably suppressed by using the positive electrode active material having a high oxygen overvoltage according to the first invention.

The first invention is applicable to, for example, a sealed alkaline storage battery that uses zinc, cadmium or a hydrogenated hydrogen-absorbing alloy as a negative electrode active material and does not need charge before use.

Since the first battery uses, as the positive electrode active material, the nickel oxyhydroxide including Mn as a solid-solution element and having a large γ ratio, the pressure within the battery is less increased during charge, and hence, the electrolyte hardly leaks for a long period of charge-discharge cycles.

The sealed alkaline storage battery (second battery) according to claim 6 (second invention) comprises a positive electrode active material of nickel oxyhydroxide; and a negative electrode of a zinc electrode, a cadmium electrode or a hydrogenated hydrogen-absorbing alloy electrode, and the positive electrode active material and a negative electrode active material are packed in total in a battery can at 75% by volume or more of a content volume of the battery can, and the nickel oxyhydroxide includes, as an additive, at least one rare earth element and/or at least one rare earth compound in a ratio of the rare earth element to the nickel oxyhydroxide of 0.05 through 5 wt %.

Furthermore, the sealed alkaline storage battery (third battery) according to claim 10 (third invention) comprises a positive electrode active material of nickel oxyhydroxide; and a negative electrode of a zinc electrode, a cadmium electrode or a hydrogenated hydrogen-absorbing alloy electrode, and the positive electrode active material and a negative electrode active material are packed in total in a battery can at 75% by volume or more of a content volume of the battery can, and the nickel oxyhydroxide includes, as a coat layer formed on a particle surface, at least one rare earth element and/or at least one rare earth compound in a ratio of the rare earth element to the nickel oxyhydroxide of 0.05 through 5 wt %.

The second and third inventions are applied to a sealed alkaline storage battery including the active materials packed in total in the battery can at 75% by volume or more of the content volume of the battery can for the following reason: Particularly in a sealed alkaline storage battery including a large amount of active materials packed in a battery can, the pressure within the battery is easily increased, and the electrolyte can easily leak during repeated charge-discharge cycles. The increase of the pressure within the battery can be remarkably suppressed by using the positive electrode active material having a high oxygen overvoltage according to the second or third invention.

In the second battery, the nickel oxyhydroxide includes, as an additive, at least one rare earth element and/or at least one rare earth compound in a ratio of the rare earth element to the nickel oxyhydroxide of 0.05 through 5 wt %, and in the third battery, the nickel oxyhydroxide includes, as a coat layer formed on a particle surface, at least one rare earth element and/or at least one rare earth compound in a ratio of the rare earth element to the nickel oxyhydroxide of 0.05 through 5 wt %. When the amount of a rare earth element and/or a rare earth compound to be included as the additive or as the coat layer is smaller than 0.05 wt % in a ratio of the rare earth element to the nickel oxyhydroxide, the oxygen overvoltage of the positive electrode cannot be sufficiently increased, and hence, the evolution of an oxygen gas during charge cannot be sufficiently suppressed. On the other hand, when the amount to be included as the additive or as the coat layer exceeds 5 wt %, the amount of the nickel oxyhydroxide to be packed as the active material is decreased so that the discharge capacity can be lowered.

The rare earth element is a general term for 17 elements: scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). Examples of the rare earth compound are an oxide, a hydroxide, a fluoride and a carbonate. For the purpose of increasing the oxygen overvoltage of the positive electrode, yttrium, erbium and ytterbium are preferred as the rare earth element, and an yttrium compound, an erbium compound and an ytterbium compound are preferred as the rare earth compound.

The nickel oxyhydroxide serving as the positive electrode active material preferably has a valence of nickel of 3.0 through 3.8 when fully charged. When the nickel oxyhydroxide has a valence of nickel smaller than 3.0, a sufficient discharge capacity is difficult to attain. No nickel oxyhydroxide has a valence of nickel larger than 3.8. Even when the battery is continuously charged after being fully charged, merely an oxygen gas is generated through decomposition of water, and the valence of nickel never exceeds 3.8.

The nickel oxyhydroxide is obtained, for example, by oxidizing nickel hydroxide with an oxidizing agent such as sodium hypochlorite (NaClO).

The nickel oxyhydroxide can include, as a solid-solution element, at least one element selected from the group consisting of manganese (Mn), zinc (Zn), cobalt (Co), bismuth (Bi) and rare earth elements. When the nickel oxyhydroxide including any of these elements as a solid-solution element is used, the oxygen overvoltage of the positive electrode can be further increased. The nickel oxyhydroxide preferably has a ratio of a solid-solution element defined as follows of 5 through 50%:

$$\text{Ratio of solid-solution element (\%)} = \{X/(X+N)\} \times 100$$

wherein X indicates the number of atoms of the solid-solution element included in the nickel oxyhydroxide, and N indicates the number of nickel atoms included in the nickel oxyhydroxide.

When the ratio of a solid-solution element is too small, the oxygen overvoltage of the positive electrode cannot be effectively increased. When the ratio of a solid-solution element is too large, the amount of the nickel oxyhydroxide to be packed in a given volume is decreased, resulting in lowering the discharge capacity.

The coat layer formed in the third battery can be obtained, for example, by adding a nickel hydroxide powder to an aqueous solution of a salt of a rare earth element, adjusting the pH of the resultant solution by adding a sodium hydroxide aqueous solution with stirring, and stirring the solution for 30 through 60 minutes, so as to chemically precipitating the rare earth element as a hydride on particle surfaces of nickel hydroxide. The amount used for coating can be adjusted by changing the concentration of the aqueous solution of the salt of the rare earth element or the proportion thereof to the nickel hydroxide powder. The coat layer can also be formed by a mechanical charge method for dry blending a nickel hydroxide powder and a rare earth element and/or a rare earth compound in a non-oxidizing atmosphere. Examples of the non-oxidizing atmosphere are atmospheres of an inert gas, hydrogen, nitrogen and vacuum. The oxidation of nickel hydroxide can be conducted before forming the coat layer or after forming the coat layer.

The positive electrode of the second or third battery includes a predetermined amount of a rare earth element and/or a rare earth compound, and hence has a high oxygen overvoltage. Accordingly, the pressure within the battery is less increased during charge, and the electrolyte hardly leaks for a long period of charge-discharge cycles.

Moreover, the sealed alkaline storage battery (fourth battery) according to claim 14 (fourth invention) comprises a positive electrode active material of nickel oxyhydroxide; and a negative electrode of a zinc electrode, a cadmium electrode or a hydrogenated hydrogen-absorbing alloy electrode, and the positive electrode active material and a negative electrode active material are packed in total in a battery can at 75% by volume or more of a content volume of the battery can, and the nickel oxyhydroxide has a half-width of a peak in a lattice plane (003) in an X-ray diffraction pattern of 0.8° or more.

The fourth invention is applied to a sealed alkaline storage battery including the active materials packed in total in the battery can at 75% by volume or more of the content volume of the battery can because the increase of the pressure within the battery derived from decrease in the utilization of the active material is particularly serious in a sealed alkaline storage battery including a large amount of active materials packed in the battery can.

As the crystallinity of nickel oxyhydroxide is poorer, the half-width of the peak in the lattice plane (003) in the X-ray diffraction pattern is larger and the peak is broader. In this invention, in order to improve the utilization of the active material, the nickel oxyhydroxide with poor crystallinity having a half-width of the peak in the lattice plane (003) in the X-ray diffraction pattern of 0.8° or more is used as the positive electrode active material. Herein, a half-width of a peak means a peak width at a half height of the peak from a base line.

Nickel oxyhydroxide (NiOOH) is changed into nickel hydroxide (Ni(OH)$_2$) by discharge, and the nickel hydroxide generated through the discharge is changed into nickel oxyhydroxide by charge. Protons (H$^+$) are released from nickel oxyhydroxide into the electrolyte during discharge, and the released protons are absorbed by nickel hydroxide during charge. Accordingly, in order to sufficiently use nickel oxyhydroxide in the charge-discharge reaction, protons should easily move in the nickel oxyhydroxide. The nickel oxyhydroxide where protons can easily move is nickel oxyhydroxide with poor crystallinity. This is because the nickel oxyhydroxide with poor crystallinity having a half-width of the peak in the lattice plane (003) in the X-ray diffraction pattern of 0.8° or more is used in this invention.

Nickel oxyhydroxide can be obtained, for example, by oxidizing nickel hydroxide with an oxidizing agent such as sodium hypochlorite (NaClO). Nickel hydroxide can be obtained, for example, as a precipitate by mixing an alkaline aqueous solution (such as a sodium hydroxide aqueous solution) with an aqueous solution of a salt of nickel (such as a nickel sulfate aqueous solution). The crystallinity of nickel hydroxide can be adjusted by adjusting the pH of the mixed solution used for precipitating nickel hydroxide. As the pH of the mixed solution is lower, the crystallinity of the resultant nickel hydroxide is poorer. Accordingly, the crystallinity of nickel oxyhydroxide obtained by oxidizing this nickel hydroxide is also poorer.

The nickel oxyhydroxide can include, as a solid-solution element, at least one element selected from the group consisting of bismuth (Bi), cadmium (Cd), cobalt (Co), magnesium (Mg), manganese (Mn), yttrium (Y) and zinc (Zn). When nickel oxyhydroxide includes any of these elements as a solid-solution element, the nickel oxyhydroxide can be suppressed from swelling. The nickel oxyhydroxide preferably has a ratio of a solid-solution element of 5 through 50%.

When the ratio of a solid-solution element is too small, the nickel oxyhydroxide cannot be effectively suppressed from swelling. When the ratio of a solid-solution element is too large, the amount of nickel oxyhydroxide to be packed is decreased, resulting in lowering the discharge capacity.

Since the fourth battery uses, as the positive electrode active material, the nickel oxyhydroxide with poor crystallinity in which protons can easily move during charge-discharge, the utilization of the active material can be kept high for a long period of charge-discharge cycles. Also, since the utilization of the active material can be kept high for a long period of charge-discharge cycles, the pressure within the battery is less increased during charge, and hence, the electrolyte hardly leaks for a long period of charge-discharge cycles.

PREFERRED EMBODIMENTS

The present invention will now be described in detail on the basis of preferred embodiments, and it is noted that the invention is not limited to the following embodiments but can be practiced with appropriate modification without departing from the scope of the invention.

(Experiment 1)

In this experiment, with regard to sealed alkaline storage batteries using zinc as a negative electrode active material and using, as a positive electrode active material, nickel oxyhydroxide including Mn as a solid-solution element, manganese dioxide, or a mixture of nickel oxide and manganese dioxide, the capacity retention ratios and the numbers of batteries suffering leakage were obtained at various charge-discharge cycles.

(Embodiment 1)

[Preparation of Positive Electrode]

A nickel sulfate aqueous solution in a concentration of 0.1 mole/liter and a manganese sulfate aqueous solution in a concentration of 0.1 mole/liter were mixed in an atomic ratio between nickel and manganese of 4:1. Then, 100 ml of the thus obtained mixed aqueous solution and 100 ml of a 5 wt % ammonia aqueous solution were simultaneously poured into water contained in a bath, and the solution in the bath was mixed with the temperature kept at 35° C. for 1 hour. Then, the solution in the bath was adjusted to pH 11 by adding dropwise a 20 wt % sodium hydroxide aqueous solution thereto with stirring, and the resultant solution was stirred for another 1 hour. During the stirring, the pH of the solution was monitored by using a pH meter with an automatic temperature compensating function, so that the pH of the solution could be constantly kept at 11±0.3 by adding dropwise a 20 wt % sodium hydroxide aqueous solution every time the pH was slightly lowered. Subsequently, a precipitate produced in the bath was filtrated, washed with water and dried under vacuum at room temperature (approximately 25° C.). Thus, nickel hydroxide including Mn as a solid-solution element in a ratio of the number of Mn atoms to the total number of Mn atoms and Ni atoms of 20% was obtained. It was confirmed through X-ray diffraction of the crystal structure that this nickel hydroxide belongs to $\alpha$-Ni(OH)$_2$.

Then, 500 ml of a sodium hydroxide aqueous solution in a concentration of 10 mole/liter and 500 ml of a 10 wt % sodium hypochlorite aqueous solution were mixed with stirring, and the resultant solution was heated to 60° C., so as to give a solution for oxidation treatment. To 1000 ml of this solution for oxidation treatment, 100 g of the aforementioned nickel hydroxide including Mn as a solid-solution element was added, and the resultant mixture was stirred for 1 hour. Then, a precipitate was filtrated, washed with water and dried at 60° C., thereby obtaining nickel oxyhydroxide including Mn as a solid-solution element to be used as a positive electrode active material. In the thus obtained nickel oxyhydroxide including Mn as a solid-solution element, the numbers of Mn atoms and Ni atoms were obtained by atomic absorption, so as to calculate a Mn ratio based on the obtained numbers. As a result, the Mn ratio was found to be 20%.

Subsequently, 90 g of a powder of the thus obtained nickel oxyhydroxide including Mn as a solid-solution element, 10 g of a graphite powder and 10 g of a 30 wt % potassium hydroxide aqueous solution were mixed by using a mixer for 30 minutes. The resultant was compressedly molded into a hollow cylindrical positive electrode with an outer diameter of 1.3 cm, an inner diameter of 0.85 cm and a height of 1.15 cm. In fabricating a battery, three hollow cylindrical positive electrodes thus obtained were serially stacked to be used as one hollow cylindrical positive electrode.

[Preparation of Negative Electrode]

A gel negative electrode was prepared by mixing 65 parts by weight of a zinc powder serving as a negative electrode active material, 34 parts by weight of a 40 wt % potassium hydroxide aqueous solution including a saturation amount of zinc oxide (ZnO), and 1 part by weight of an acrylic acid resin (manufactured by Nihon Junyaku Co. Ltd.; Product Code: polyacrylic acid 150) serving as a gelling agent.

[Fabrication of First Battery]

The aforementioned positive electrode and negative electrode were used to fabricate a nickel-zinc storage battery (first battery) a in an AA size having a so-called "inside-out type" structure (having a positive electrode terminal on a battery can and a negative electrode terminal on a battery cap). Herein, an inside-out type battery means a battery including a gel negative electrode contained in a hollow portion of a hollow cylindrical positive electrode with a separator in a cylindrical film shape sandwiched therebetween. In order to control the battery capacity by a positive electrode capacity, the electrochemical capacity ratio between the positive electrode and the negative electrode was set at 1:2 (which capacity ratio was also adopted in all batteries fabricated in Experiments 1 through 4). The total amount of the negative electrode active material and the positive electrode active material to be packed in the battery can was set to occupy 80% by volume of the content volume of the battery can. (Also in each of all the batteries fabricated below, a negative electrode active material and a positive electrode active material together occupy 80% by volume of the content volume of the battery can.)

Figure 1:
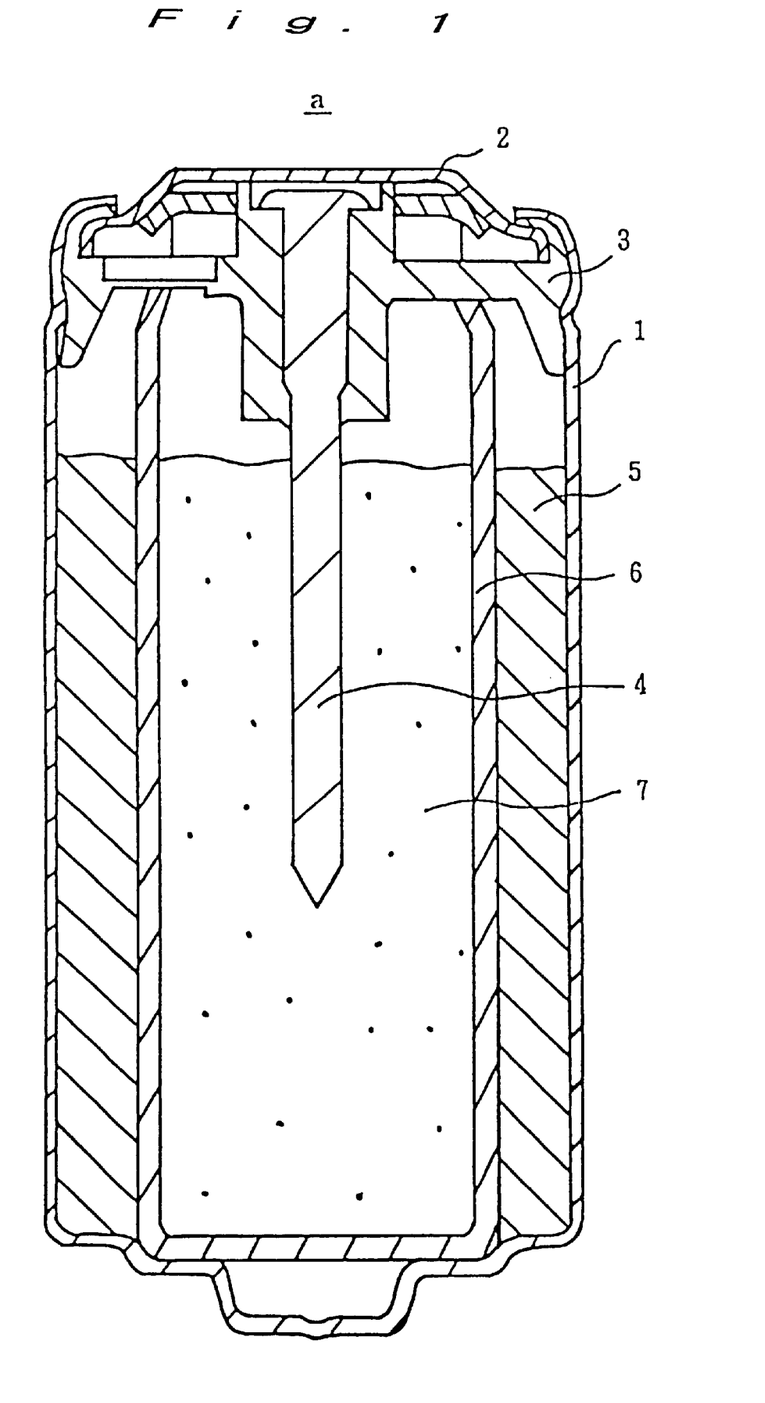
FIG. 1 is a partial sectional diagram of a nickel-zinc storage battery manufactured in an embodiment.

FIG. 1 is a partial sectional view of the thus fabricated nickel-zinc storage battery. The nickel-zinc storage battery a of FIG. 1 comprises a bottomed cylindrical positive electrode can (positive electrode external terminal) 1, a negative electrode cap (negative electrode external terminal) 2, an insulating packing 3, a negative current collector 4 of brass, a hollow cylindrical positive electrode (nickel electrode) 5, a cylindrical film-shaped separator 6 made from mainly vinylon, a gel negative electrode (zinc electrode) 7 and the like.

The positive electrode 5 is contained in the positive electrode can 1 with the outer circumferential surface of the hollow cylindrical positive electrode in contact with the inner circumferential surface of the cylindrical electrode can, the outer circumferential surface of the separator 6 is pressed against the inner circumferential surface of the hollow cylindrical positive electrode 5, and the gel negative electrode 7 is filled within the separator 6. At the center of the circular section of the negative electrode 7, the negative current collector 4 is inserted with its one end supported by the insulating packing 3 for electrically insulating the positive electrode can 1 from the negative electrode cap 2. An opening of the positive electrode can 1 is covered with the negative electrode cap 2. The battery is sealed by filling the opening of the positive electrode can 1 with the insulating packing 3, placing the negative electrode cap 2 thereon, and caulking the edge of the opening of the positive electrode can inward.

Comparative Example 1

First, 500 ml of a nickel nitrate aqueous solution in a concentration of 2 mole/liter and 1500 ml of a 10 wt % sodium hypochlorite aqueous solution were added dropwise to and mixed with 2000 ml of a potassium hydroxide aqueous solution in a concentration of 14 mole/liter, and the resultant mixture was gradually cooled for 1 hour. Then, a produced precipitate was filtrated, washed with a potassium hydroxide aqueous solution in a concentration of 2 mole/liter, washed with water, and dried at 90° C. Thus, a nickel oxide powder to be used as a positive electrode active material was obtained.

Subsequently, 50 g of the aforementioned nickel oxide powder, 30 g of a manganese dioxide powder, 15 g of a graphite powder and 5 g of a polyethylene resin were mixed. The obtained mixture was mixed with 20 ml of a potassium hydroxide aqueous solution in a concentration of 7 mole/liter, and the resultant was compressedly molded into a positive electrode.

A sealed alkaline storage battery X was fabricated in the same manner as in Embodiment 1 except that this positive electrode was used.

Comparative Example 2

One hundred g of a manganese dioxide powder, 15 g of a graphite powder and 5 g of a polyethylene resin were mixed, and the resultant mixture was mixed with 20 ml of a potassium hydroxide aqueous solution in a concentration of 7 mole/liter. The resultant was compressedly molded into a positive electrode.

A sealed alkaline storage battery Y was fabricated in the same manner as in Embodiment 1 except that this positive electrode was used.

[Capacity Retention Ratio and the Number of Batteries Suffering Leakage at Various Charge-discharge Cycles of Each Battery]

Each of the aforementioned three types of sealed alkaline storage batteries a, X and Y, which are different from one another in the positive electrode active material alone, was subjected to a charge-discharge cycle test for discharging to a battery voltage of 0.9 V through a load of 3.9 Ω and then charging to a battery voltage of 1.95 V at 150 mA in each cycle. Thus, the capacity retention ratios and the numbers of batteries suffering leakage of each type of batteries were obtained at the 5th, 10th, 25th and 50th cycles. With regard to each type of the batteries, ten batteries were used to obtain the capacity retention ratio and the number of batteries suffering leakage. The results are shown in Table 1. The capacity retention ratio at each cycle of each battery listed in Table 1 is shown as a proportion (%) to the discharge capacity at the 1st cycle of the battery, and is obtained as the average of the capacity retention ratios of the batteries from which the electrolyte did not leak. Also, the numerator of a fraction listed in the item of the proportion of batteries suffering leakage in Table 1 corresponds to the number of batteries from which the electrolyte leaked.

TABLE 1

| Battery | Charge-discharge cycle | Capacity retention ratio | Proportion of batteries suffering leakage |
| --- | --- | --- | --- |
| a | 5 | 100 | 0/10 |
|   | 10 | 100 | 0/10 |
|   | 25 | 100 | 0/10 |
|   | 50 | 98 | 0/10 |
| X | 5 | 100 | 0/10 |
|   | 10 | 100 | 2/10 |
|   | 25 | 95 | 4/10 |
|   | 50 | 93 | 6/10 |
| Y | 5 | 60 | 3/10 |
|   | 10 | 50 | 5/10 |
|   | 25 | 45 | 7/10 |
|   | 50 | 40 | 8/10 |

As is shown in Table 1, with regard to the sealed alkaline storage battery a (first battery), retention ratios at the 25th cycle and the 50th cycle were as high as 100 and 98, respectively, and the number of batteries suffering leakage is 0 even at the 50th cycle. On the other hand, with regard to the sealed alkaline storage battery X (comparative battery), the capacity retention ratios at the 25th and 50th cycles are 95 and 93, respectively, which are merely slightly lower than those of the sealed alkaline storage battery a, but the numbers of batteries suffering leakage are as large as 2, 4 and 6 at the 10th, 25th and 50th cycles, respectively. With regard to the sealed alkaline storage battery Y (comparative battery), the capacity retention ratios at the 5th, 10th, 25th and 50th cycles are as low as 60, 50, 45 and 40, respectively, and the numbers of batteries suffering leakage are as large as 3, 5, 7 and 8, respectively.

(Experiment 2)

In this experiment, the relationship between the γ ratio and the leakage was examined.

Solutions for oxidation treatment were prepared by mixing 500 ml of a sodium hydroxide aqueous solution in a concentration of 10 mole/liter with 100 ml, 200 ml, 300 ml or 400 ml of a 10 wt % sodium hypochlorite aqueous solution with stirring and by heating the resultant solutions to 60° C. Sealed alkaline storage batteries A, B, C and D were fabricated in the same manner as in Embodiment 1 except that these solutions for oxidation treatment were respectively used. These sealed alkaline storage batteries A through D were subjected to the charge-discharge cycle test under the same conditions as in Experiment 1, so as to obtain the number of batteries suffering leakage at the 5th, 10th, 25th and 50th cycles. The results are shown in Table 2. In Table 2, the results of the sealed alkaline storage battery a are transferred from Table 1.

TABLE 2

| | | Proportion of batteries suffering leakage | | | |
| --- | --- | --- | --- | --- | --- |
| Battery | γ ratio | 5th cycle | 10th cycle | 25th cycle | 50th cycle |
| A | 46 | 0/10 | 1/10 | 2/10 | 4/10 |
| B | 65 | 0/10 | 0/10 | 1/10 | 2/10 |
| C | 87 | 0/10 | 0/10 | 1/10 | 1/10 |
| D | 90 | 0/10 | 0/10 | 0/10 | 0/10 |
| a | 100 | 0/10 | 0/10 | 0/10 | 0/10 |

As is shown in Table 2, with regard to the sealed alkaline storage batteries B, C, D and a (first battery), the number of batteries suffering leakage is 0 at the 10th cycle, while it is 1 with regard to the sealed alkaline storage battery A (comparative example). This fact reveals that it is necessary to use nickel oxyhydroxide including Mn as a solid-solution element and having a γ ratio of 65% or more in order to obtain a highly reliable sealed alkaline storage battery free from leakage in approximately 10 cycles. Also, with regard to the sealed alkaline storage batteries D and a, the number of batteries suffering leakage is 0 even at the 50th cycle. This fact reveals that a γ ratio of 90% or more is preferred in order to obtain a sealed alkaline storage battery with very high reliability. As the γ ratio is lower, namely, as the proportion of β-nickel oxyhydroxide in the nickel oxyhydroxide is larger, the electrolyte more easily leaks because the oxygen overvoltage cannot be largely increased even by adding Mn as a solid-solution element when the proportion of β-nickel oxyhydroxide is large.

(Experiment 3)

In this experiment, the relationship between the Mn ratio and the discharge capacity at the 1st cycle and the relationship between the Mn ratio and the leakage were examined.

[Relationship Between Mn Ratio and Discharge Capacity at 1st Cycle]

Figure 2:
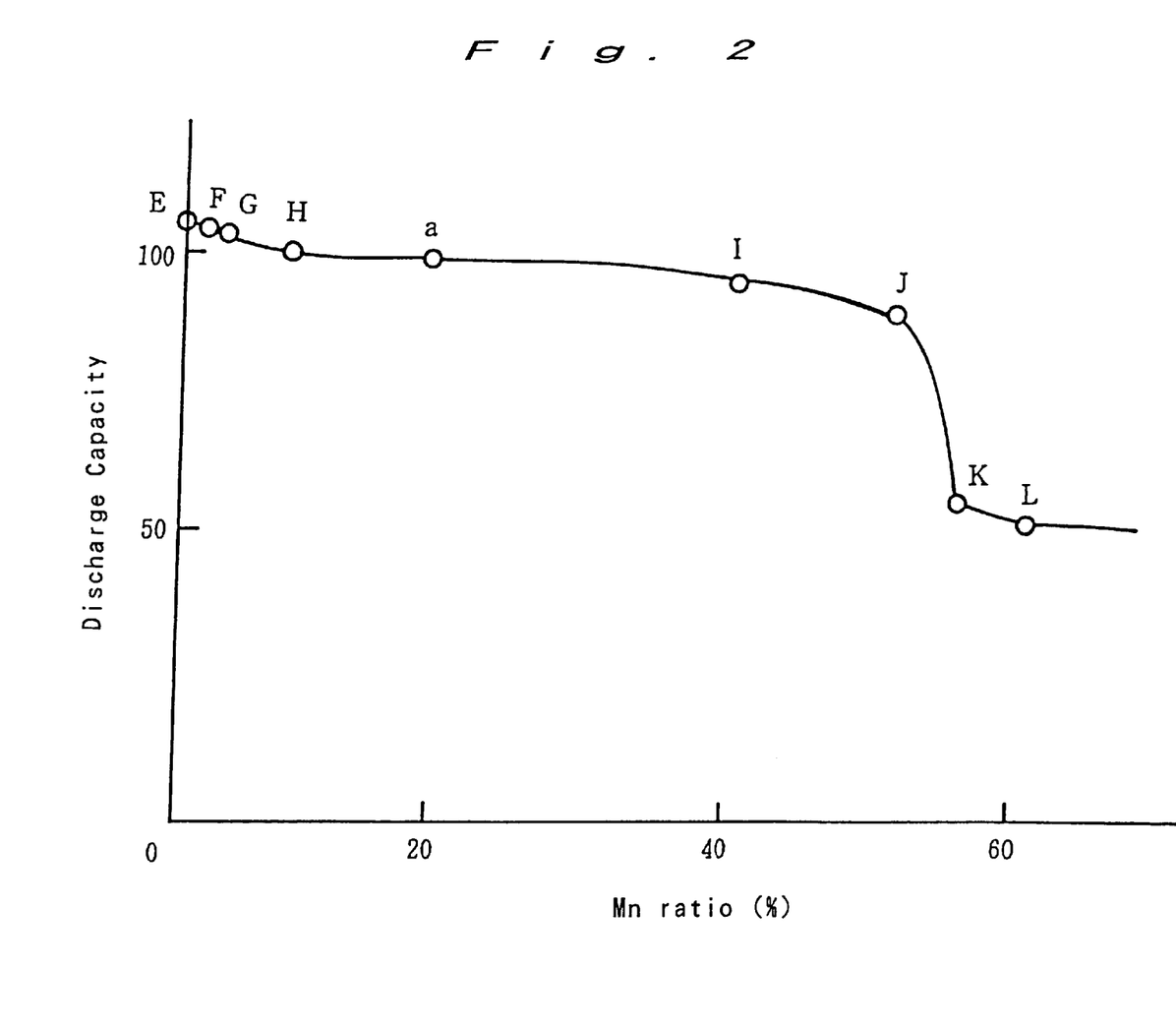
FIG. 2 is a graph for showing the relationship between a Mn ratio and a discharge capacity at the 1st cycle.

Various nickel oxyhydroxides including Mn as a solid-solution element respectively at a Mn ratio of 0%, 2%, 5%, 10%, 40%, 50%, 55% and 60% were prepared in the same manner as in Embodiment 1 except that the mixing ratio between the nickel sulfate aqueous solution and the manganese sulfate aqueous solution for obtaining nickel hydroxide including Mn as a solid-solution element was changed. Subsequently, by using these nickel oxyhydroxides including Mn as a solid-solution element as positive electrode active materials, sealed alkaline storage batteries E, F, G, H, I, J, K and L were respectively fabricated. Each of these sealed alkaline storage batteries E through L was discharged to a battery voltage of 0.9 V through a load of 3.9 Ω, so as to obtain the discharge capacity at the 1st cycle. The results are shown in FIG. 2. In FIG. 2, the discharge capacity at the 1st cycle of the sealed alkaline storage battery a (having a Mn ratio of 20%) is also shown. FIG. 2 is a graph for showing the relationship between the Mn ratio of nickel oxyhydroxide including Mn as a solid-solution element and the discharge capacity at the 1st cycle, with the ordinate indicating the discharge capacity at the 1st cycle and the abscissa indicating the Mn ratio, wherein the discharge capacity at the 1st cycle indicated by the ordinate is shown as an index obtained by assuming the discharge capacity at the 1st cycle of the sealed alkaline storage battery a as 100.

As is shown in FIG. 2, as compared with the sealed alkaline storage batteries E through J and a having the Mn ratios of 50% or less, the sealed alkaline storage batteries K and L respectively having the Mn ratios of 55% and 60% have very small discharge capacities at the 1st cycle. This is because, when the Mn ratio is too high, Mn cannot be completely dissolved in nickel oxyhydroxide as a solid-solution element, so that produced free Mn oxide can obstruct the discharge. This fact reveals that the Mn ratio is preferably 50% or less.

[Relationship Between Mn Ratio and Leakage]

The sealed alkaline storage batteries E, F, G, H, I and J, which have practically sufficient initial discharge capacities, were subjected to the charge-discharge cycle test under the same conditions as in Experiment 1, so as to obtain the number of batteries suffering leakage at the 5th, 10th, 25th and 50th cycles. The results are shown in Table 3. In Table 3, the results of the sealed alkaline storage battery a are also transferred from Table 1.

TABLE 3

Proportion of batteries suffering leakage

| Battery | Mn ratio | 5th cycle | 10th cycle | 25th cycle | 50th cycle |
|---|---|---|---|---|---|
| J | 50 | 0/10 | 0/10 | 0/10 | 0/10 |
| I | 40 | 0/10 | 0/10 | 0/10 | 0/10 |
| a | 20 | 0/10 | 0/10 | 0/10 | 0/10 |
| H | 10 | 0/10 | 0/10 | 0/10 | 0/10 |
| G | 5 | 0/10 | 0/10 | 0/10 | 0/10 |
| F | 2 | 0/10 | 0/10 | 1/10 | 1/10 |
| E | 0 | 0/10 | 1/10 | 1/10 | 2/10 |

It is understood, from Table 3, that the electrolyte is made more hardly to leak by adding Mn as a solid-solution element to nickel oxyhydroxide. Also, with regard to the sealed alkaline storage battery B having the Mn ratio of 5%, the number of batteries suffering leakage is 0 even at the 50th cycle, while the electrolyte leaks at the 25th cycle in the sealed alkaline storage battery F having the Mn ratio of 2%. This fact reveals that the Mn ratio is preferably 5% or more in order to obtain a highly reliable sealed alkaline storage battery free from leakage for a long period of charge-discharge cycles.

In consideration of the relationship between the Mn ratio and the discharge capacity at the 1st cycle and the relationship between the Mn ratio and the number of batteries suffering leakage comprehensively, it is practically preferred to use nickel oxyhydroxide including Mn as a solid-solution element at the Mn ratio of 5 through 50% as a positive electrode active material.

(Experiment 4)

In this experiment, in using, as a positive electrode active material, a mixture of nickel oxyhydroxide including Mn as a solid-solution element and α-Ni(OH)$_2$ including Mn as a solid-solution element, the allowable mixing ratio of α-Ni(OH)$_2$ was examined.

Positive electrode active materials were prepared by mixing, at various ratios, α-Ni(OH)$_2$ with the Mn ratio of 20% and nickel oxyhydroxide with the γ ratio of 65% and the Mn ratio of 20%, which were obtained in preparing the positive electrodes in Embodiment 1.

Furthermore, 55 parts by weight of a zinc powder, 10 parts by weight of a zinc oxide powder, 34 parts by weight of a 40 wt % potassium hydroxide aqueous solution including a saturation amount of zinc oxide and 1 part by weight of an acrylic acid resin serving as a gelling agent were mixed, thereby obtaining a gel negative electrode. Sealed alkaline storage batteries M, N, O, P and Q were fabricated in the same manner as in Embodiment 1 except that the aforementioned positive electrode active materials and negative electrode were used. Each of the batteries was subjected to a charge-discharge cycle test for charging to a battery voltage of 1.95 V at 150 mA and discharging to a battery voltage of 0.9 V through a load of 3.9Ω in each cycle, so as to obtain the number of batteries suffering leakage at the 5th, 10th, 25th and 50th cycles. The results are shown in Table 4.

TABLE 4

| Battery | Proportion of nickel oxyhydroxide including Mn as solid-solution element (wt %) | Proportion of batteries suffering leakage | | | |
|---|---|---|---|---|---|
| | | 5th cycle | 10th cycle | 25th cycle | 50th cycle |
| M | 50 | 1/10 | 1/10 | 1/10 | 3/10 |
| N | 60 | 0/10 | 0/10 | 0/10 | 1/10 |
| O | 70 | 0/10 | 0/10 | 0/10 | 0/10 |
| P | 90 | 0/10 | 0/10 | 0/10 | 0/10 |
| Q | 100 | 0/10 | 0/10 | 0/10 | 0/10 |

It is understood from Table 4 that a mixture of nickel oxyhydroxide including Mn as a solid-solution element and α-Ni(OH)$_2$ including Mn as a solid-solution element can be used as a positive electrode active material, and that the mixing ratio of α-Ni(OH)$_2$ including Mn as a solid-solution element should be 40 wt % or less in using the mixture.

(Experiment 5)

In this experiment, with regard to second batteries A1 through A21 using nickel oxyhydroxide including a rare earth element or a rare earth compound, a comparative battery C1 using nickel oxyhydroxide including neither a rare earth element nor a rare earth compound, a comparative battery C2 using manganese dioxide as a positive electrode active material and a comparative battery C3 using a mixture of nickel oxide and manganese dioxide as a positive electrode active material, the capacity retention ratios and the numbers of batteries suffering leakage were obtained at the 5th, 10th, 25th, 50th and 75th cycles.

(Second Batteries A1 Through A21)

[Preparation of Positive Electrode]

One liter of a mixed solution including 500 ml of a sodium hydroxide aqueous solution in a concentration of 10 mole/liter and 500 ml of a 10 wt % sodium hypochlorite aqueous solution was heated to 60° C., to which 100 g of a nickel hydroxide powder was added with stirring. After mixing and stirring this mixture for 1 hour, a precipitate is filtrated, washed with water and dried at 60° C., thereby obtaining nickel oxyhydroxide.

One hundred parts by weight of the thus obtained nickel oxyhydroxide (positive electrode active material); 1 part by weight of yttrium, scandium, lanthanum, cerium, praseodymium, neodymium, promethium, samarium, europium, gadolinium, terbium, dysprosium, holmium, erbium, thulium, ytterbium, lutetium, Mm (Misch metal; a mixture of rare earth elements), or 1 part by weight, measured by rare earth element displacement, of $Y_2O_3$, $YF_3$ or $Y_2(CO_3)_3$; 10 parts by weight of graphite, 10 parts by weight of a 30 wt % potassium hydroxide aqueous solution were mixed with a mixer for 30 minutes. The resultant mixture was compressedly molded into a hollow cylindrical positive electrode with an outer diameter of 1.3 cm, an inner diameter of 0.85 cm and a height of 1.15 cm. In this manner, each rare earth compound was added to nickel oxyhydroxide in a ratio of the rare earth element to nickel oxyhydroxide of 1 wt %. As the Mm, a mixture including La, Ce, Pr and Nd in an atomic ratio of 45:30:15:10 was used. In fabricating each battery, three hollow cylindrical positive electrodes thus obtained were serially stacked to be used as one hollow cylindrical positive electrode.

[Preparation of Negative Electrode]

A gel negative electrode was prepared by mixing 65 parts by weight of a zinc powder, 34 parts by weight of a 40 wt % potassium hydroxide aqueous solution including 6 wt % (saturation amount) of zinc oxide (ZnO) and 1 part by weight of an acrylic acid resin (manufactured by Nihon Junyaku, Co., Ltd.; Product Code: polyacrylic acid 150) serving as a gelling agent.

[Fabrication of Batteries]

Nickel-zinc storage batteries (second batteries) A1 through A21 in an AA size were fabricated in the same manner as in Embodiment 1 of Experiment 1 except that the aforementioned positive electrodes and negative electrode were respectively used.

(Comparative battery C1)

A comparative battery C1 was fabricated in the same manner as the second batteries A1 through A21 except that none of the rare earth elements and rare earth compounds was added to nickel oxyhydroxide in preparing the positive electrode.

(Comparative Battery C2)

To 2000 ml of a potassium hydroxide aqueous solution in a concentration of 14 mole/liter, 500 ml of a nickel nitrate aqueous solution in a concentration of 2 mole/liter and 1500 ml of a 10 wt % sodium hypochlorite aqueous solution were added dropwise to be mixed, and the resultant mixture was gradually cooled over 1 hour. Subsequently, a produced precipitate was filtrated, washed with a potassium hydroxide aqueous solution in a concentration of 2 mole/liter, washed with water, and dried at 90° C. Thus, a nickel oxide powder to be used as a positive electrode active material was obtained.

Fifty g of the aforementioned nickel oxide powder, 30 g of a manganese dioxide powder, 15 g of a graphite powder and 5 g of a polyethylene resin were mixed, with which 20 ml of a potassium hydroxide aqueous solution in a concentration of 7 mole/liter was further mixed. The resultant mixture was compressedly molded into a hollow cylindrical positive electrode.

A comparative battery C2 was fabricated in the same manner as the second batteries A1 through A21 except that this positive electrode was used.

(Comparative Battery C3)

One hundred g of a manganese dioxide powder, 15 g of a graphite powder and 5 g of a polyethylene resin were mixed, with which 20 ml of a potassium hydroxide aqueous solution in a concentration of 7 mole/liter was further mixed. The resultant mixture was compressedly molded into a hollow cylindrical positive electrode.

A comparative battery C3 was fabricated in the same manner as the second batteries A1 through A21 except that this positive electrode was used.

[Capacity Retention Ratio and Number of Batteries Suffering Leakage at Various Charge-discharge Cycles of Each Battery]

Each battery was subjected to the charge-discharge cycle test under the same conditions as in Experiment 1, so as to obtain the capacity retention ratio and the number of batteries suffering leakage at the 5th, 10th, 25th, 50th, 75th and 100th cycles. Ten batteries were used with regard to each type of batteries for obtaining the capacity retention ratio and the number of batteries suffering leakage. The results are shown in Tables 5 through 8. The capacity retention ratio at each charge-discharge cycle listed in these tables is shown as a proportion to the discharge capacity at the 1st cycle of the battery, and is obtained as the average of the capacity retention ratios of batteries from which the electrolyte did not leak. Also, the numerator of a fraction listed in the item of the proportion of batteries suffering leakage in these tables corresponds to the number of batteries from which the electrolyte leaked.

TABLE 5

| Battery | Charge-discharge cycles | Capacity retention ratio (%) | Proportion of batteries suffering leakage |
|---|---|---|---|
| A1 (including Y) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 100 | 0/10 |
| A2 (including Sc) | 5 | 100 | 0/10 |
| | 10 | 100 | 0/10 |
| | 25 | 100 | 0/10 |
| | 50 | 100 | 0/10 |
| | 75 | 99 | 0/10 |
| | 100 | 96 | 1/10 |
| A3 (including La) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 98 | 1/10 |
| A4 (including Ce) | 5 | 100 | 0/10 |
| | 10 | 100 | 0/10 |
| | 25 | 100 | 0/10 |
| | 50 | 100 | 0/10 |
| | 75 | 99 | 1/10 |
| | 100 | 97 | 1/10 |
| A5 (including Pr) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 99 | 1/10 |
| A6 (including Nd) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 98 | 1/10 |

TABLE 6

| Battery | Charge-discharge cycles | Capacity retention ratio (%) | Proportion of batteries suffering leakage |
|---|---|---|---|
| A7 (including Pm) | 5 | 100 | 0/10 |
| | 10 | 100 | 0/10 |
| | 25 | 100 | 0/10 |
| | 50 | 100 | 0/10 |
| | 75 | 99 | 1/10 |
| | 100 | 97 | 2/10 |
| A8 (including Sm) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 98 | 1/10 |

TABLE 6-continued

| Battery | Charge-discharge cycles | Capacity retention ratio (%) | Proportion of batteries suffering leakage |
|---|---|---|---|
| A9 (including Eu) | 5 | 100 | 0/10 |
|  | 10 | 100 | 0/10 |
|  | 25 | 100 | 0/10 |
|  | 50 | 100 | 0/10 |
|  | 75 | 99 | 1/10 |
|  | 100 | 98 | 2/10 |
| A10 (including Gd) | 5 | 100 | 0/10 |
|  | 10 | 100 | 0/10 |
|  | 25 | 100 | 0/10 |
|  | 50 | 100 | 0/10 |
|  | 75 | 99 | 0/10 |
|  | 100 | 97 | 1/10 |
| A11 (including Tb) | 5 | 100 | 0/10 |
|  | 10 | 100 | 0/10 |
|  | 25 | 100 | 0/10 |
|  | 50 | 97 | 1/10 |
|  | 75 | 96 | 2/10 |
|  | 100 | 94 | 2/10 |
| A12 (including Dy) | 5 | 100 | 0/10 |
|  | 10 | 100 | 0/10 |
|  | 25 | 100 | 0/10 |
|  | 50 | 95 | 2/10 |
|  | 75 | 93 | 3/10 |
|  | 100 | 91 | 3/10 |

TABLE 7

| Battery | Charge-discharge cycles | Capacity retention ratio (%) | Proportion of batteries suffering leakage |
|---|---|---|---|
| A13 (including Ho) | 5 | 100 | 0/10 |
|  | 10 | 100 | 0/10 |
|  | 25 | 100 | 0/10 |
|  | 50 | 99 | 1/10 |
|  | 75 | 96 | 2/10 |
|  | 100 | 95 | 3/10 |
| A14 (including Er) | 5 | 100 | 0/10 |
|  | 10 | 100 | 0/10 |
|  | 25 | 100 | 0/10 |
|  | 50 | 100 | 0/10 |
|  | 75 | 100 | 0/10 |
|  | 100 | 100 | 0/10 |
| A15 (including Tm) | 5 | 100 | 0/10 |
|  | 10 | 100 | 0/10 |
|  | 25 | 100 | 0/10 |
|  | 50 | 99 | 0/10 |
|  | 75 | 98 | 1/10 |
|  | 100 | 94 | 3/10 |
| A16 (including Yb) | 5 | 100 | 0/10 |
|  | 10 | 100 | 0/10 |
|  | 25 | 100 | 0/10 |
|  | 50 | 100 | 0/10 |
|  | 75 | 100 | 0/10 |
|  | 100 | 100 | 0/10 |
| A17 (including Lu) | 5 | 100 | 0/10 |
|  | 10 | 100 | 0/10 |
|  | 25 | 100 | 0/10 |
|  | 50 | 98 | 1/10 |
|  | 75 | 96 | 2/10 |
|  | 100 | 94 | 3/10 |
| A18 (including Mm) | 5 | 100 | 0/10 |
|  | 10 | 100 | 0/10 |
|  | 25 | 100 | 0/10 |
|  | 50 | 100 | 0/10 |
|  | 75 | 100 | 0/10 |
|  | 100 | 98 | 1/10 |

TABLE 8

| Battery | Charge-discharge cycles | Capacity retention ratio (%) | Proportion of batteries suffering leakage |
|---|---|---|---|
| A19 (including $Y_2O_3$) | 5 | 100 | 0/10 |
|  | 10 | 100 | 0/10 |
|  | 25 | 100 | 0/10 |
|  | 50 | 100 | 0/10 |
|  | 75 | 100 | 0/10 |
|  | 100 | 100 | 0/10 |
| A20 (including $YF_3$) | 5 | 100 | 0/10 |
|  | 10 | 100 | 0/10 |
|  | 25 | 100 | 0/10 |
|  | 50 | 100 | 0/10 |
|  | 75 | 100 | 0/10 |
|  | 100 | 100 | 0/10 |
| A21 (including $Y_2(CO_3)_3$) | 5 | 100 | 0/10 |
|  | 10 | 100 | 0/10 |
|  | 25 | 100 | 0/10 |
|  | 50 | 100 | 0/10 |
|  | 75 | 100 | 0/10 |
|  | 100 | 100 | 0/10 |
| C1 | 5 | 100 | 0/10 |
|  | 10 | 100 | 0/10 |
|  | 25 | 98 | 0/10 |
|  | 50 | 95 | 0/10 |
|  | 75 | 89 | 2/10 |
|  | 100 | 85 | 5/10 |
| C2 | 5 | 100 | 0/10 |
|  | 10 | 100 | 2/10 |
|  | 25 | 95 | 4/10 |
|  | 50 | 93 | 6/10 |
|  | 75 | 87 | 8/10 |
|  | 100 | 79 | 9/10 |
| C3 | 5 | 60 | 3/10 |
|  | 10 | 55 | 3/10 |
|  | 25 | 50 | 5/10 |
|  | 50 | 45 | 7/10 |
|  | 75 | 40 | 8/10 |
|  | 100 | 35 | 9/10 |

It is understood, from Tables 5 through 8, that the second batteries A1 through A21 have higher capacity retention ratios and more hardly suffer leakage for a long period of charge-discharge cycles than the comparative batteries C1 through C3.

(Experiment 6)

In this experiment, the relationship between the amount of yttrium added to nickel oxyhydroxide and the discharge capacity and the leakage was examined.

Sealed alkaline storage batteries a1, a2, a3, a4, a5, a6, a7, a8 and a9 were fabricated in the same manner as the second battery A1 except that yttrium was respectively added in an amount of 0.01 part by weight, 0.05 part by weight, 0.1 part by weight, 0.5 part by weight, 2 parts by weight, 3 parts by weight, 5 parts by weight, 6 parts by weight or 7 parts by weight based on 100 parts by weight of nickel oxyhydroxide. The amounts of yttrium included in the batteries a1 through a9 are respectively 0.01, 0.05, 0.1, 0.5, 2, 3, 5, 6 and 7 wt % in a ratio of yttrium to nickel oxyhydroxide. Each of the batteries a1 through a9 was subjected to the charge-discharge cycle test under the same conditions as in Experiment 1, so as to obtain the discharge capacity at the 1st cycle, and the discharge capacity and the number of batteries suffering leakage at the 100th cycle. The results are shown in Table 9. In Table 9, the discharge capacity at the 1st cycle and the discharge capacity and the number of batteries suffering leakage at the 100th cycle of the second battery A1 are also shown, and each discharge capacity at the 1st cycle and the 100th cycle listed in Table 9 is shown as an index obtained by assuming the discharge capacity at the 1st cycle of the second battery A1 as 100.

TABLE 9

| Battery | Amount of yttrium (wt %) | Discharge capacity at 1st cycle | Discharge capacity at 100th cycle | Proportion of batteries suffering leakage |
|---|---|---|---|---|
| a1 | 0.01 | 101 | 86 | 4/10 |
| a2 | 0.05 | 101 | 92 | 0/10 |
| a3 | 0.1 | 101 | 95 | 0/10 |
| a4 | 0.5 | 100 | 100 | 0/10 |
| A1 | 1 | 100 | 100 | 0/10 |
| a5 | 2 | 99 | 99 | 0/10 |
| a6 | 3 | 98 | 98 | 0/10 |
| a7 | 5 | 96 | 96 | 0/10 |
| a8 | 6 | 86 | 86 | 0/10 |
| a9 | 7 | 82 | 82 | 0/10 |

It is understood from Table 9 that the amount of yttrium to be added to nickel oxyhydroxide should be 0.05 through 5 wt % in order to obtain a battery having a large discharge capacity and hardly suffering leakage. It was also confirmed that, in using another rare earth element or rare earth compound, the amount (measured as a rare earth element in using a rare earth compound) to be added to nickel oxyhydroxide should be 0.05 through 5 wt %. The discharge capacity at the 100th cycle of the battery a1 is small because the amount of added yttrium is so small that the oxygen overvoltage cannot be sufficiently increased, resulting in changing γ-nickel oxyhydroxide into β-nickel oxyhydroxide so as to decrease the number of reactive electrons.

(Experiment 7)

In this experiment, the relationship between the valence of nickel in nickel oxyhydroxide and the discharge capacity and the leakage was examined.

Sealed alkaline storage batteries a10, a11, a12 and a13 were fabricated in the same manner as the second battery A1 except that the amount of the 10 wt % sodium hypochlorite aqueous solution to be mixed with 500 ml of the sodium hydroxide aqueous solution was 100 ml, 200 ml, 300 ml or 1000 ml, instead of 500 ml. Each of the batteries was subjected to the charge-discharge cycle test under the same conditions as in Experiment 1, so as to obtain the discharge capacity at the 1st cycle and the number of batteries suffering leakage at the 100th cycle. The results are shown in Table 10. In Table 10, the discharge capacity at the 1st cycle and the number of batteries suffering leakage at the 100th cycle of the second battery A1 are also shown, and each discharge capacity listed in Table 10 is shown as an index obtained by assuming the discharge capacity at the 1st cycle of the second battery A1 as 100.

TABLE 10

| Battery | Valence of nickel | Battery capacity | Proportion of batteries suffering leakage |
|---|---|---|---|
| a10 | 2.6 | 30 | 0/10 |
| a11 | 2.8 | 70 | 0/10 |
| a12 | 3.0 | 98 | 0/10 |
| A1 | 3.5 | 100 | 0/10 |
| a13 | 3.8 | 110 | 0/10 |

It is understood from Table 10 that nickel oxyhydroxide having a valence of nickel of 3.0 through 3.8 is preferably used as a positive electrode active material in order to obtain a battery with a large discharge capacity.

(Experiment 8)

In this experiment, with regard to third batteries B1 through B17 using nickel oxyhydroxide whose particle surfaces were coated with a rare earth element or a rare earth compound, the capacity retention ratio and the number of batteries suffering leakage were obtained at the 5th, 10th, 25th, 50th, 75th and 100th cycles.

(Third batteries B1 through B17)

One liter of aqueous solutions were obtained by dissolving, in water, 3.43 g of yttrium sulfate ($Y_2(SO_4)_3 \cdot 8H_2O$), 6.73 g of scandium nitrate ($Sc(NO_3)_3 \cdot 4H_2O$), 3.12 g of lanthanum nitrate ($La(NO_3)_3 \cdot 6H_2O$), 3.10 g of cerium nitrate ($Ce(NO_3)_3 \cdot 6H_2O$), 3.09 g of praseodymium nitrate ($Pr(NO_3)_3 \cdot 6H_2O$), 3.04 g of neodymium nitrate ($Nd(NO_3)_3 \cdot 6H_2O$), 3.03 g of promethium nitrate ($Pm(NO_3)_3 \cdot 6H_2O$), 2.95 g of samarium nitrate ($Sm(NO_3)_3 \cdot 6H_2O$), 2.93 g of europium nitrate ($Eu(NO_3)_3 \cdot 6H_2O$), 2.75 g of gadolinium nitrate ($Gd(NO_3)_3 \cdot 5H_2O$), 2.74 g of terbium nitrate ($Tb(NO_3)_3 \cdot 5H_2O$), 2.70 g of dysprosium nitrate ($Dy(NO_3)_3 \cdot 5H_2O$), 2.67 g of holmium nitrate ($Ho(NO_3)_3 \cdot 5H_2O$), 2.65 g of erbium nitrate ($Er(NO_3)_3 \cdot 5H_2O$), 2.63 g of thulium nitrate ($Tm(NO_3)_3 \cdot 5H_2O$), 2.39 g of ytterbium nitrate ($Yb(NO_3)_3 \cdot 3H_2O$), or 2.37 g of lutetium nitrate ($Lu(NO_3)_3 \cdot 3H_2O$). To each of these aqueous solutions, 100 g of a solid-solution particle powder, that is, nickel hydroxide including 20 wt % of manganese as a solid-solution element, was added. To the resultant solution, a sodium hydroxide aqueous solution in a concentration of 1 mole/liter was added with stirring, so as to adjust pH of the resultant solution to 11, and the solution was stirred for 1 hour. During the stirring, the pH was monitored by using a pH meter with a temperature compensating function, thereby substantially constantly keeping the pH at 11 by adding a sodium hydroxide aqueous solution in a concentration of 1 mole/liter every time the pH was slightly lowered. Subsequently, a precipitate was filtrated, washed with water and dried, thereby preparing a composite particle powder in which a coat layer of the rare earth element was formed on the particle surface of nickel hydroxide. The proportion of the rare earth element (the coat layer) to nickel hydroxide (base particle) is 1 wt % in all the powders.

Subsequently, a mixture including 500 ml of a sodium hydroxide aqueous solution in a concentration of 10 mole/liter and 500 ml of a 10 wt % sodium hypochlorite aqueous solution was heated to 60° C., to which 100 g of the composite particle powder was added with stirring. The resultant solution was stirred for 1 hour, and a precipitate was filtrated, washed with water and dried at 60° C., thereby preparing a composite particle powder in which a coat layer of the rare earth element was formed on the particle surface of nickel oxyhydroxide. The proportion of the rare earth element (the coat layer) to nickel oxyhydroxide (base particle) was substantially 1 wt % in all the powders.

One hundred parts by weight of the thus obtained composite particle powder, 10 parts by weight of graphite and 10 parts by weight of a 30 wt % potassium hydroxide aqueous solution were stirred for 30 minutes with a mixer, and the resultant was compressedly molded into a hollow cylindrical positive electrode with an outer diameter of 1.3 cm, an inner diameter of 0.85 cm and a height of 1.15 cm. In fabricating each battery, three hollow cylindrical positive electrodes thus obtained were serially stacked to be used as one hollow cylindrical positive electrode.

Subsequently, the third batteries B1 through B17 were fabricated in the same manner as the second batteries A1 through A21 except that the aforementioned positive electrodes were respectively used.

[Capacity Retention Ratio and Number of Batteries Suffering Leakage at Various Charge-discharge Cycles of Each Battery]

Each of the batteries was subjected to the charge-discharge cycle test under the same conditions as in Experiment 1, so as to obtain the capacity retention ratio and the number of batteries suffering leakage at the 5th, 10th, 25th, 50th, 75th and 100th cycles. Ten batteries were used with regard to each type of batteries to obtain the capacity retention ratio and the number of batteries suffering leakage. The results are shown in Tables 11 through 13. Each capacity retention ratio listed in these tables is shown as a proportion to the discharge capacity at the 1st cycle of the battery, and is obtained as the average of the capacity retention ratios of batteries from which the electrolyte did not leak.

TABLE 11

| Battery | Charge-discharge cycles | Capacity retention ratio (%) | Proportion of batteries suffering leakage |
|---|---|---|---|
| B1 (coated with Y) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 100 | 0/10 |
| B2 (coated with Sc) | 5 | 100 | 0/10 |
| | 10 | 100 | 0/10 |
| | 25 | 100 | 0/10 |
| | 50 | 100 | 0/10 |
| | 75 | 99 | 0/10 |
| | 100 | 97 | 1/10 |
| B3 (coated with La) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 99 | 1/10 |
| B4 (coated with Ce) | 5 | 100 | 0/10 |
| | 10 | 100 | 0/10 |
| | 25 | 100 | 0/10 |
| | 50 | 100 | 0/10 |
| | 75 | 99 | 1/10 |
| | 100 | 98 | 1/10 |
| B5 (coated with Pr) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 98 | 1/10 |
| B6 (coated with Nd) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 97 | 1/10 |

TABLE 12

| Battery | Charge-discharge cycles | Capacity retention ratio (%) | Proportion of batteries suffering leakage |
|---|---|---|---|
| B7 (coated with Pm) | 5 | 100 | 0/10 |
| | 10 | 100 | 0/10 |
| | 25 | 100 | 0/10 |
| | 50 | 100 | 0/10 |
| | 75 | 98 | 1/10 |
| | 100 | 96 | 2/10 |
| B8 (coated with Sm) | 5 | 100 | 0/10 |
| | 10 | 100 | 0/10 |
| | 25 | 100 | 0/10 |
| | 50 | 100 | 0/10 |
| | 75 | 99 | 0/10 |
| | 100 | 99 | 1/10 |
| B9 (coated with Eu) | 5 | 100 | 0/10 |
| | 10 | 100 | 0/10 |
| | 25 | 100 | 0/10 |
| | 50 | 99 | 0/10 |
| | 75 | 98 | 1/10 |
| | 100 | 98 | 2/10 |
| B10 (coated with Gd) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 98 | 1/10 |
| B11 (coated with Tb) | 5 | 100 | 0/10 |
| | 10 | 100 | 0/10 |
| | 25 | 100 | 0/10 |
| | 50 | 99 | 0/10 |
| | 75 | 97 | 1/10 |
| | 100 | 93 | 2/10 |
| B12 (coated with Dy) | 5 | 100 | 0/10 |
| | 10 | 100 | 0/10 |
| | 25 | 100 | 0/10 |
| | 50 | 96 | 1/10 |
| | 75 | 94 | 2/10 |
| | 100 | 91 | 3/10 |

TABLE 13

| Battery | Charge-discharge cycles | Capacity retention ratio (%) | Proportion of batteries suffering leakage |
|---|---|---|---|
| B13 (coated with Ho) | 5 | 100 | 0/10 |
| | 10 | 100 | 0/10 |
| | 25 | 100 | 0/10 |
| | 50 | 99 | 0/10 |
| | 75 | 97 | 1/10 |
| | 100 | 94 | 3/10 |
| B14 (coated with Er) | 5 | 100 | 0/10 |
| | 10 | 100 | 0/10 |
| | 25 | 100 | 0/10 |
| | 50 | 100 | 0/10 |
| | 75 | 99 | 0/10 |
| | 100 | 99 | 0/10 |
| B15 (coated with Tm) | 5 | 100 | 0/10 |
| | 10 | 100 | 0/10 |
| | 25 | 100 | 0/10 |
| | 50 | 99 | 0/10 |
| | 75 | 97 | 1/10 |
| | 100 | 93 | 3/10 |
| B16 (coated with Yb) | 5 | 100 | 0/10 |
| | 10 | 100 | 0/10 |
| | 25 | 100 | 0/10 |
| | 50 | 100 | 0/10 |
| | 75 | 100 | 0/10 |
| | 100 | 100 | 1/10 |
| B17 (coated with Lu) | 5 | 100 | 0/10 |
| | 10 | 100 | 0/10 |
| | 25 | 100 | 0/10 |
| | 50 | 99 | 0/10 |
| | 75 | 95 | 2/10 |
| | 100 | 92 | 3/10 |

It is understood from Tables 11 through 13 that the third batteries B1 through B17 have high capacity retention ratios and hardly suffer leakage for a long period of charge-discharge cycles as compared with the comparative batteries C1 through C3 shown in Table 8.

(Experiment 9)

In this experiment, the relationship between the amount of yttrium for coating nickel oxyhydroxide and the discharge capacity and the leakage was examined.

Sealed alkaline storage batteries b1, b2, b3, b4, b5, b6, b7, b8 and b9 were fabricated in the same manner as the third battery B1 except that the amount of yttrium to be used was respectively 0.0343 g, 0.1715 g, 0.343 g, 1.715 g, 6.86 g, 10.29 g, 17.15 g, 20.58 g or 24.01 g. Each battery was subjected to the charge-discharge cycle test under the same conditions as in Experiment 1, so as to obtain the discharge capacity at the 1st cycle and the discharge capacity and the number of batteries suffering leakage at the 100th cycle. The results are shown in Table 14. In Table 14, the discharge capacity at the 1st cycle and the discharge capacity and the number of batteries suffering leakage at the 100th cycle of the third battery B1 are also shown, and each discharge capacity at the 1st and 100th cycles listed in Table 14 is shown as an index obtained by assuming the discharge capacity at the 1st cycle of the third battery B1 as 100. The amounts of yttrium used for coating nickel oxyhydroxide in the batteries b1 through b9 are respectively 0.01, 0.05, 0.1, 0.5, 2, 3, 5, 6 and 7 wt % in a ratio of yttrium to nickel oxyhydroxide.

TABLE 14

| Battery | Amount of yttrium (wt %) | Discharge capacity at 1st cycle | Discharge capacity at 100th cycle | Proportion of batteries suffering leakage |
| --- | --- | --- | --- | --- |
| b1 | 0.01 | 101 | 88 | 5/10 |
| b2 | 0.05 | 101 | 93 | 0/10 |
| b3 | 0.1 | 101 | 95 | 0/10 |
| b4 | 0.5 | 100 | 100 | 0/10 |
| B1 | 1 | 100 | 100 | 0/10 |
| b5 | 2 | 99 | 99 | 0/10 |
| b6 | 3 | 98 | 98 | 0/10 |
| b7 | 5 | 96 | 96 | 0/10 |
| b8 | 6 | 85 | 85 | 0/10 |
| b9 | 7 | 80 | 80 | 0/10 |

It is understood from Table 14 that the amount of yttrium to be used for coating nickel oxyhydroxide should be 0.05 through 5 wt % in order to obtain a battery having a large discharge capacity and hardly suffering leakage. It was also confirmed that, in using another rare earth element or rare earth compound, the amount to be used for coating nickel oxyhydroxide should be 0.05 through 5 wt % in a ratio of the rare earth element to nickel oxyhydroxide. The discharge capacity at the 100th cycle of the battery b1 is small because the amount of yttrium is so small that the oxygen overvoltage cannot be sufficiently increased, resulting in changing γ-nickel oxyhydroxide into β-nickel oxyhydroxide so as to decrease the number of reactive electrons.

(Experiment 10)

In this experiment, the relationship between the valence of nickel in nickel oxyhydroxide and the discharge capacity and the leakage was examined.

Sealed alkaline storage batteries b10, b11, b12 and b13 were fabricated in the same manner as the third battery B1 except that the amount of the 10 wt % sodium hypochlorite aqueous solution to be mixed with 500 ml of the sodium hydroxide aqueous solution was respectively changed to 100 ml, 200 ml, 300 ml or 1000 ml. Each battery was subjected to the charge-discharge cycle test under the same conditions as in Experiment 1, so as to obtain the discharge capacity at the 1st cycle and the number of batteries suffering leakage at the 100th cycle. The results are shown in Table 15. In Table 15, the discharge capacity at the 1st cycle and the number of batteries suffering leakage at the 100th cycle of the third battery B1 are also shown, and each discharge capacity listed in Table 15 is shown as an index obtained by assuming the discharge capacity at the 1st cycle of the third battery B1 as 100.

TABLE 15

| Battery | Valence of nickel | Battery capacity | Proportion of batteries suffering leakage |
| --- | --- | --- | --- |
| b10 | 2.6 | 30 | 0/10 |
| b11 | 2.8 | 70 | 0/10 |
| b12 | 3.0 | 98 | 0/10 |
| B1 | 3.5 | 100 | 0/10 |
| b13 | 3.8 | 110 | 0/10 |

It is understood from Table 15 that nickel oxyhydroxide having a valence of nickel of 3.0 through 3.8 is preferably used as a positive electrode active material in order to obtain a third battery with a large discharge capacity. With regard to the second battery, it was also confirmed that nickel oxyhydroxide having a valence of nickel of 3.0 through 3.8 is preferably used as a positive electrode active material.

(Experiment 11)

In this experiment, with regard to a fourth battery AB using, as a positive electrode active material, nickel oxyhydroxide having a half-width of a peak in the lattice plane (003) in the X-ray diffraction pattern of 1.0°, a conventional battery XB using manganese dioxide as a positive electrode active material and a conventional battery YB using a mixture of nickel oxide and manganese dioxide as a positive electrode active material, the utilization of the active material at the 1st and 20th cycles were obtained through a charge-discharge cycle test.

(Fourth Battery AB)

One liter of a nickel sulfate aqueous solution in a concentration of 1 mole/liter and a sodium hydroxide aqueous solution were simultaneously poured into water contained in a thermostat kept at 25° C. with stirring, thereby preparing a mixed aqueous solution with pH 12.4. This solution was stirred for 1 hour, and a produced precipitate was filtrated, washed with water and dried under vacuum at room temperature (approximately 25° C.), thereby preparing nickel hydroxide. Subsequently, 1 liter of a mixed aqueous solution including 500 ml of a sodium hydroxide aqueous solution in a concentration of 10 mole/liter and 500 ml of a 10 wt % sodium hypochlorite aqueous solution was heated to 60° C., to which 100 g of the nickel hydroxide prepared as above was added with string. The resultant solution was stirred for 1 hour, and a precipitate was filtrated, washed with water and dried at 60° C., thereby preparing nickel oxyhydroxide. This nickel oxyhydroxide was analyzed by X-ray diffraction using CuKα as a radiation source under conditions described below, so as to obtain a half-width of a peak in the lattice plane (003) (a peak in the vicinity of 2θ=12°) in the X-ray diffraction pattern. The half-width was found to be 1.0°.

[Conditions for X-ray Diffraction Analysis]

Counter electrode: Cu

Tube voltage: 40 kV

Tube current: 100 mA

Filter: Ni

Scanning rate: 2°/min.

Divergent slit: 1°

Figure 3:
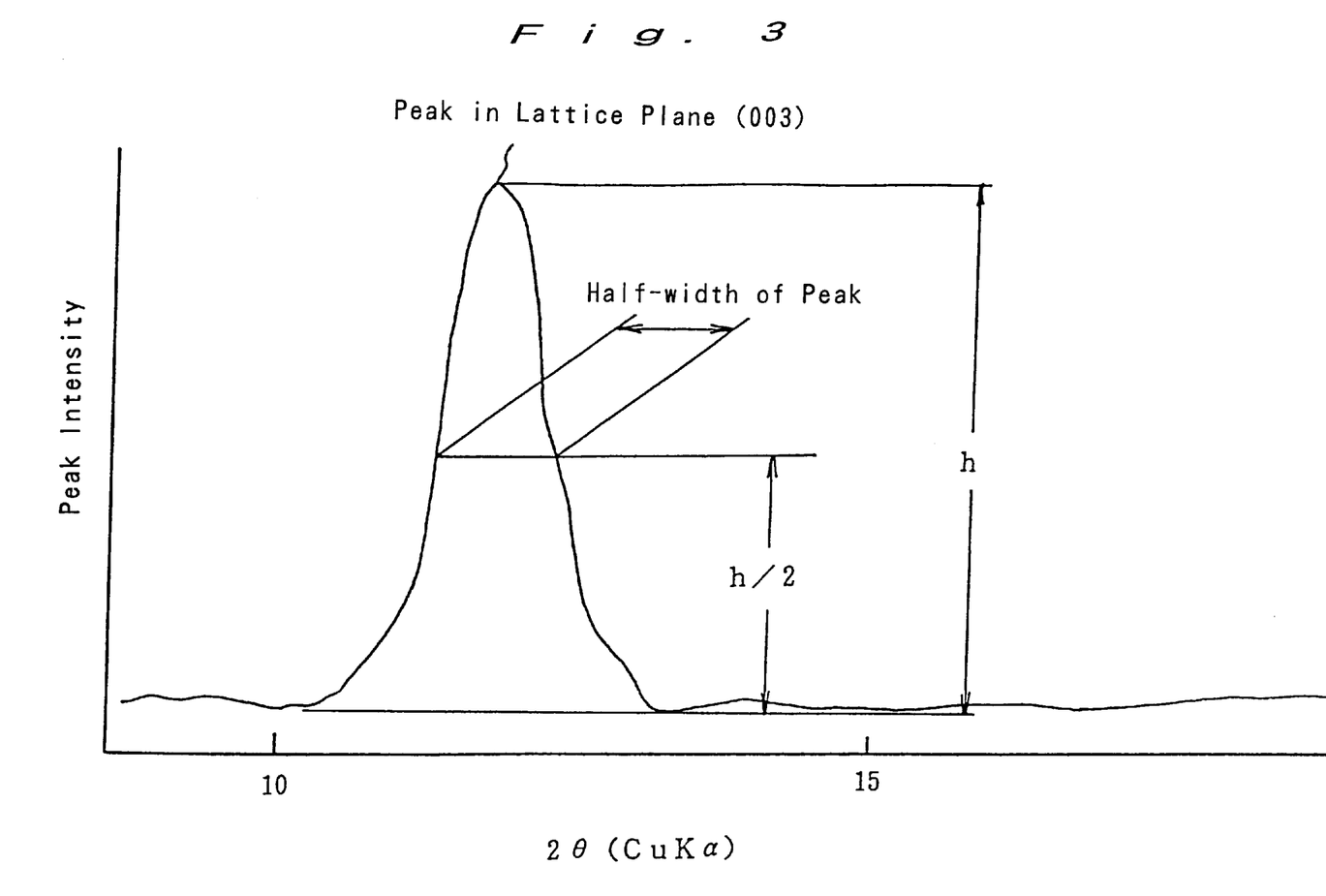
FIG. 3 is a part of an X-ray diffraction pattern of nickel oxyhydroxide prepared in an embodiment and having a half-width of 1.0°.

FIG. 3 shows a part of the X-ray diffraction pattern. In FIG. 3, h indicates the height of the peak in the lattice plane (003), and a peak width at a height h/2 corresponds to the half-width. A half-width herein is indicated by using 2θ and corresponds to a length of a half-width along the 2θ axis (abscissa) measured in degrees (°), wherein θ indicates Bragg angle.

Then, 90 g of the thus obtained nickel oxyhydroxide (positive electrode active material), 10 g of graphite and 10 g of a 30 wt % potassium hydroxide aqueous solution were mixed by using a mixer for 30 minutes, and the resultant was compressedly molded into a hollow cylindrical positive electrode with an outer diameter of 1.3 cm, an inner diameter of 0.85 cm and a height of 1.15 cm. In fabricating a battery, three hollow cylindrical positive electrodes thus obtained were serially stacked to be used as one hollow cylindrical positive electrode.

A gel negative electrode was prepared by mixing 65 g of a zinc powder, 34 g of a 40 wt % potassium hydroxide aqueous solution including 6 wt % (saturation amount) of zinc oxide (ZnO) and 1 g of an acrylic acid resin (manufactured by Nihon Junyaku Co., Ltd.; Product Code: polyacrylic acid 150) serving as a gelling agent.

A sealed nickel-zinc storage battery (fourth battery) AB in an AA size was fabricated in the same manner as in Embodiment 1 of Experiment 1 except that the aforementioned positive electrode and negative electrode were used.

(Comparative Battery XB)

One hundred g of a manganese dioxide powder, 15 g of a graphite powder and 5 g of a polyethylene resin were mixed, with which 20 ml of a potassium hydroxide aqueous solution in a concentration of 7 mole/liter was further mixed. The resultant was compressedly molded into a hollow cylindrical positive electrode. A comparative battery XB was fabricated in the same manner as the fourth battery AB except that this positive electrode was used.

(Comparative Battery YB)

After adding dropwise 500 ml of a nickel nitrate aqueous solution in a concentration of 2 mole/liter and 1500 ml of a 10 wt % sodium hypochlorite aqueous solution to 2 liters of a potassium hydroxide aqueous solution in a concentration of 14 mole/liter, the resultant mixture was gradually cooled over 1 hour. Subsequently, a produced precipitate was filtrated, washed with a potassium hydroxide aqueous solution in a concentration of 2 mole/liter, washed with water and dried at 90° C., thereby obtaining a nickel oxide powder to be used as a positive electrode active material. Fifty g of this nickel oxide powder, 30 g of a manganese dioxide powder, 15 g of a graphite powder and 5 g of a polyethylene resin were mixed, with which 20 ml of a potassium hydroxide aqueous solution in a concentration of 7, mole/liter was further mixed. The resultant was compressedly molded into a hollow cylindrical positive electrode. A comparative battery YB was fabricated in the same manner as the fourth battery AB except that this positive electrode was used.

[Utization of Active Material of Each Battery at 1st and 20th Cycles]

Each battery was subjected to a charge-discharge cycle test for discharging to a battery voltage of 0.9 V through a load of 3.9Ω and charging to a battery voltage of 1.95 V at 150 mA in each cycle, so as to obtain the utilization of the active material at the 1st and 20th cycles defined by a formula below. Ten batteries were used with regard to each type of the batteries. The results are shown in Table 16. The utilization of each battery listed in Table 16 is the average of the utilization of the ten batteries.

Utilization of active material (%)={Discharge capacity (mAh)/ [amount of nickel hydroxide (g)×288 (mAh/g)]}×100

TABLE 16

| Battery | Utilization of active material (%) | |
|---|---|---|
| | 1st cycle | 20th cycle |
| AB | 100 | 100 |
| XB | 70 | 60 |
| YB | 80 | 75 |

As is shown in Table 16, the utilization of the active material of the fourth battery AB is higher than those of the conventional batteries XB and YB both at the 1st cycle and the 20th cycle. This means that a sealed alkaline storage battery having higher utilization of an active material than the conventional battery can be obtained by using nickel oxyhydroxide with poor crystainity as the positive electrode active material.

(Experiment 12)

In this experiment, with regard to eight types of sealed alkaline storage batteries using, as a positive electrode active material, nickel oxyhydroxides having different half-widths, the utilization of the active materials at the 1st, 20th and 50th cycles were obtained. Thus, the relationship between the half-width of nickel oxyhydroxide and the utilization of the active material was examined.

Six types of nickel oxyhydroxides respectively having a half-width of a peak in the lattice plane (003) in the X-ray diffraction pattern of 0.5°, 0.6°, 0.7°, 0.8°, 1.2° or 1.4° were prepared in the same manner as the positive electrode active material for the fourth battery AB except that the pH of the mixed aqueous solution used for precipitating nickel hydroxide was respectively changed to 13.4, 13.2, 13.0, 12.7, 11.7 or 10.9. Subsequently, six types of sealed nickel-zinc storage batteries b, c, d, e, f and g were fabricated in the same manner as the fourth battery AB except that these nickel oxyhydroxides were respectively used as the positive electrode active materials. Each of the batteries was subjected to the charge-discharge cycle test under the same conditions as in Experiment 1, so as to obtain the utilization of the active materials at the 1st, 20th and 50th cycles. The results are shown in Table 17. In Table 17, the utilization of the active material at the 1st, 20th and 50th cycles of the fourth battery AB are also shown.

TABLE 17

| Battery | Half-width 2θ | Utilization of active material (%) | | |
|---|---|---|---|---|
| | | 1st cycle | 20th cycle | 50th cycle |
| b | 0.5° | 90 | 84 | 61 |
| c | 0.6° | 94 | 89 | 70 |
| d | 0.7° | 100 | 95 | 86 |
| e | 0.8° | 100 | 100 | 100 |
| AB | 1.0° | 100 | 100 | 100 |
| f | 1.2° | 100 | 100 | 100 |
| g | 1.4° | 100 | 100 | 100 |

As is shown in Table 17, in the batteries AB and e through g using the nickel oxyhydroxide with poor crystallinity having a half-width of 0.8° or more, the utilization of the active material is high not only at the initial charge-discharge cycles but also at the 50th cycle. In contrast, in the batteries b through d using the nickel oxyhydroxide with good crystallinity having a half-width smaller than 0.8°, the utilization of the active material is low at the 50th cycle. These results reveal that it is necessary to use nickel oxyhydroxide having a half-width of 0.8° or more in order to obtain a battery having high utilization for a long period of charge-discharge cycles.

(Experiment 13)

In this experiment, with regard to sealed alkaline storage batteries using, as a positive electrode active material, nickel oxyhydroxide including bismuth, cadmium, cobalt, magnesium, manganese, yttrium or zinc as a solid-solution element, the utilization of the active material was obtained at the 1st, 20th and 50th cycles.

Seven types of nickel oxyhydroxides respectively including bismuth, cadmium, cobalt, magnesium, manganese, yttrium or zinc as a solid-solution element were prepared in the same manner as the positive electrode active material for the fourth battery AB except that 1 liter of the nickel sulfate aqueous solution in a concentration of 1 mole/liter used in preparing nickel hydroxide was respectively replaced with 1 liter of a nickel sulfate aqueous solution in a concentration of 0.8 mole/liter, or 1 liter of a bismuth sulfate aqueous solution, a cadmium sulfate aqueous solution, a cobalt sulfate aqueous solution, a magnesium sulfate aqueous solution, a manganese sulfate aqueous solution or an yttrium sulfate aqueous solution in a concentration of 0.2 mole/liter measured by metal element displacement. All the nickel oxyhydroxides have a ratio of the solid-solution element defined as above of 20%. Subsequently, seven types of sealed nickel-zinc storage batteries i, j, k, l, m, n and o were fabricated in the same manner as the fourth battery AB except that the aforementioned nickel oxyhydroxides were respectively used as the positive electrode active materials. Each of the batteries was subjected to the charge-discharge cycle test under the same conditions as in Experiment 1, so as to obtain the utilization of the active material and the proportion of batteries suffering leakage at the 1st, 20th and 50th cycles. The results are shown in Table 18.

TABLE 18

| Battery | Half-width 2θ | Utilization of active material (%) | | |
|---|---|---|---|---|
| | | 1st cycle | 20th cycle | 50th cycle |
| i | 1.0° | 100 | 100 | 100 |
| j | 1.0° | 100 | 100 | 100 |
| k | 1.0° | 100 | 100 | 100 |
| l | 1.0° | 100 | 100 | 100 |
| m | 1.0° | 100 | 100 | 100 |
| n | 1.0° | 100 | 100 | 100 |
| o | 1.0° | 100 | 100 | 100 |

It is understood from Table 18 that, also in using nickel oxyhydroxide including bismuth, cadmium, cobalt, magnesium, manganese, yttrium or zinc as the solid-solution element, a battery that can keep high utilization of the active material and can be free from leakage for a long period of charge-discharge cycles can be obtained by using nickel oxyhydroxide with poor crystallinity having a half-width of 0.8° or more.

Industrial Applicability

A sealed alkaline storage battery according to the invention is useful as a highly reliable battery because the electrolyte hardly leaks for a long period of charge-discharge cycles.

What is claimed is:

1. A sealed alkaline storage battery comprising a positive electrode active material and a negative electrode active material packed in total in a battery can at 75% by volume or more of a content volume of the battery can, the negative electrode active material forming a zinc negative electrode and comprising a mixture of zinc and zinc oxide, and the positive electrode active material including 60 through 100 wt % of nickel oxyhydroxide including Mn as a solid-solution element and having a γ ratio defined as follows of 65 through 100%, and 40 through 0 wt % of α-Ni(OH)$_2$:

$$\gamma \text{ ratio } (\%) = \{S1/(S1+S2)\} \times 100$$

in which S1 indicates a peak area in a lattice plane (003) in an X-ray diffraction pattern of the nickel oxyhydroxide including Mn as a solid-solution element; and S2 indicates a peak area in a lattice plane (001) in the X-ray diffraction pattern of the nickel oxyhydroxide including Mn as a solid-solution element;

wherein said X-ray diffraction patterns are obtained by X-ray diffraction analysis using a counter electrode of Cu, a tube voltage of 40 kV, a tube current of 100 mA and a filter of Ni.

2. The sealed alkaline storage battery according to claim 1, wherein the nickel oxyhydroxide including Mn as a solid-solution element has a γ ratio of 90 through 100%.

3. The sealed alkaline storage battery according to claim 1, wherein the nickel oxyhydroxide including Mn as a solid-solution element has a Mn ratio defined as follows of 5 through 50%:

$$\text{Mn ratio } (\%) = \{M/(M+N)\} \times 100$$

wherein M indicates the number of Mn atoms included in the nickel oxyhydroxide including Mn as a solid-solution element; and N indicates the number of Ni atoms included in the nickel oxyhydroxide including Mn as a solid-solution element.

4. The sealed alkaline storage battery according to claim 1, wherein the nickel oxyhydroxide including Mn as a solid-solution element is obtained by oxidizing nickel hydroxide including Mn as a solid-solution element with an oxidizing agent.

* * * * *